United States Patent [19]
Dunnigan
[11] 4,178,299
[45] Dec. 11, 1979

[54] PROCESS FOR PREPARING 1,3-DIACYL GLYCEROLS

[75] Inventor: Daniel A. Dunnigan, Winthrop Harbor, Ill.

[73] Assignee: Abbott Laboratories, North Chicago, Ill.

[21] Appl. No.: 890,433

[22] Filed: Mar. 27, 1978

[51] Int. Cl.$^2$ .......... C11C 3/12; C09F 5/08
[52] U.S. Cl. .......... 260/409; 560/263; 260/410.7
[58] Field of Search .......... 260/409; 560/263

[56] References Cited

U.S. PATENT DOCUMENTS

| | | | |
|---|---|---|---|
| 2,451,377 | 10/1948 | Bliss | 260/409 |
| 3,847,989 | 11/1974 | Platz et al. | 260/409 |
| 3,988,446 | 10/1976 | Paris | 260/410.7 |

*Primary Examiner*—John F. Niebling
*Attorney, Agent, or Firm*—Paul D. Burgauer; Robert L. Niblack

[57] ABSTRACT

It has been found that dialkanoylacetones can be reduced to the corresponding glycerols by a rapid process using ruthenium on an inert support as the hydrogenation catalyst.

10 Claims, No Drawings

PROCESS FOR PREPARING 1,3-DIACYL GLYCEROLS

DETAILED DESCRIPTION OF THE INVENTION

Triglycerides of the type described in U.S. Pat. No. 3,988,446 have recently been established as very useful pro-drugs which surpass the usefulness of the active moiety attached to the 2-position of the glycerol since they show very little or no side effects so often associated with acidic drugs. In the process of making these pro-drugs, one generally uses the inexpensive dihydroxy acetone as a starting material.

With the use of dihydroxy acetone as a starting material, it is assured that the fatty acid reacts with the hydroxy groups in the 1- and the 3-positions which would not be assured if one uses glycerol as a starting material. However, the 2-position of the easily obtainable 1,3-dialkanoylacetone must be reduced to the corresponding hydroxy group. In the above mentioned reference, this reduction is carried out with sodiumborohydride which requires several manipulations, work-up and rather strict temperature control.

It is, therefore, an object of the present invention to provide a practical process for the reduction of a dialkanoylacetone; it is a further object of this invention to provide a process for the reduction of dialkanoylacetone in relatively pure form; it is a particular object of this invention to provide a process for making 1,3-diacylglycerol which produces the latter in good quality and good yield.

These and other objects are accomplished by the process of preparing a 1,3-diacylglycerol consisting essentially in hydrogenating the corresponding 1,3-alkanoylacetone in the presence of an inert, neutral solvent and finely divided metallic ruthenium on an inert support at a temperature between 0° C. and the boiling point of the reaction mixture and at a hydrogen pressure of between 0 and 30 atm. In a preferred embodiment, 1,3-dialkanoylacetone is hydrogenated in the presence of a 5% ruthenium catalyst supported on carbon. The metallic ruthenium is calculated to be present in an amount of between 0.4 and 2.0% by weight of the amount of said acetone, using an ether as the reaction medium. Preferred ethers are tetrahydrofuran, dioxane or diethylether and if preferred, those ethers that are miscible with water can be diluted with up to 25% water.

The above reference to 1,3-dialkanoylacetone is meant to include those compounds wherein the alkanoyl group is represented by the formula $CH_3(CH_2)_nCOO$ wherein n represents an integer of between 0 and 16, preferably an even numbered digit. This preference, however, has nothing to do with the applicability of the present process; it is merely an indication of a preference based on costs of starting materials.

In order to illustrate the process of the present invention, reference is made to the following example, which, however, serves only as such illustration and is not intended to limit the invention in any respect.

EXAMPLE

A solution of 397 g of 1,3-didecanoylacetone in 800 ml of tetrahydrofuran is hydrogenated at 3 atm. hydrogen pressure in the presence of 80 g of 5% ruthenium-on-carbon. The theoretical amount of hydrogen is taken up by the reactant in less than 2 hours at which time the catalyst is filtered off, washed with tetrahydrofuran and the combined filtrate and washings are concentrated on a rotary evaporator to a syrup. Treating the latter with Skelly B (a saturated hydrocarbon mixture predominantly consisting of hexane boiling at 60°–68° C.) produces 353 g of crystalline 1,3-didecanoylglycerol (88% of theory).

The above catalyst, after the named washing step, can be reused in the same fashion as shown above. In fact, in a second use of the same catalyst with the above procedure, the rate of hydrogen uptake is about identical, producing the same yield as shown above.

In modifications of the above example, yields of 90–95% of the pure crystalline 1,3-diacylglycerols are obtained by using ether, 80% aqueous tetrahydrofuran, dioxane, liquid alkanes or cyclo alkanes as the reaction media. In the case of alkanes, hydrogen uptake is considerably slower as when an ether is used. However, other organic solvents which are not reactive towards hydroxy or keto groups and which are neutral can be used in place of the above ethers. Of course, it should be understood that the medium selected should have sufficient solubility for the starting material of this reaction to prevent the need of large quantities thereof. For that reason, diethylether or tetrahydrofuran appear to be the best suited reaction solvents.

Metallic ruthenium is a very well known hydrogenation catalyst and is commercially supported on a variety of carriers. While ruthenium on alumina, on bentonite, on silica gel and other common carriers can be used, the current procedure produces best results when the ruthenium is supported by carbon, also a commonly used catalyst carrier. The results obtained with Ru/C are also superior over the use of finely divided ruthenium oxide, rhodium on carbon or Raney nickel which all could be used, but do not produce the yield shown above or are deficient in the rate of hydrogen uptake.

While the above example is shown to be carried out at room temperature, other experiments carried out at temperatures of 60° and 80°, depending on the reaction medium, produce similar results with the exception of that the uptake of hydrogen proceeds at a faster rate. However, since the uptake at room temperature using the above catalyst is sufficiently fast, no great advantage is seen in providing for heating elements. On the other hand, when the reaction is carried out in large batches or is intended to be modified for continuous operation, operating temperatures near the boiling point of the reaction medium should be used which then enables the operator to flash off the solvent from the already hot reaction mixture.

The above example only demonstrates the current method using a dialkanoylacetone wherein the alkyl groups derive from the $C_{10}$ fatty acid, the procedure is identical when the starting acyloxy groups are acetoxy, caproyloxy, stearyloxy or the like. In all instances, yields of 80–95% of theory are obtained.

What is claimed is:

1. The process of preparing a 1,3-diacylglycerol consisting essentially in hydrogenating the corresponding 1,3-dialkanoylacetone in the presence of an inert neutral solvent and finely divided metallic ruthenium on an inert support at a temperature between 0° C. and the boiling point of the reaction mixture and at a hydrogen pressure of 0–30 atm.

2. The process of claim 1 wherein said temperature is room temperature.

3. The process of claim 1 wherein said inert support is carbon.

4. The process of claim 1 wherein said inert solvent is tetrahydrofuran.

5. The process of claim 4 wherein said tetrahydrofuran is mixed with water in a ratio of between 5:1 and 3:1.

6. The process of claim 5 wherein said inert support is carbon.

7. The process of claim 1 wherein said inert solvent is dioxane.

8. The process of claim 1 wherein said inert solvent is diethylether.

9. The process of claim 1 wherein said ruthenium is used in an amount of 0.4–2% by weight of the amount of said acetone.

10. The process of claim 9 wherein said ruthenium is supported by carbon.

* * * * *